(12) United States Patent
Geipel et al.

(10) Patent No.: US 11,583,826 B2
(45) Date of Patent: Feb. 21, 2023

(54) PACKING ELEMENT HAVING STRIPS WITH ASYMMETRICAL ARCH OR WAVE SHAPES

(71) Applicant: RVT Process Equipment GmbH, Steinwiesen (DE)

(72) Inventors: Werner Geipel, Steinwiesen (DE); Christian Geipel, Kronach (DE); Christian Mehringer, Kronach (DE); Karin Hoffmann, Marktrodach (DE)

(73) Assignee: RVT PROCESS EQUIPMENT GMBH, Steinwiesen (DE)

(*) Notice: Subject to any disclaimer, the term of this patent is extended or adjusted under 35 U.S.C. 154(b) by 0 days.

(21) Appl. No.: 17/268,348

(22) PCT Filed: Aug. 13, 2019

(86) PCT No.: PCT/EP2019/071693
§ 371 (c)(1),
(2) Date: Feb. 12, 2021

(87) PCT Pub. No.: WO2020/035484
PCT Pub. Date: Feb. 20, 2020

(65) Prior Publication Data
US 2021/0316270 A1    Oct. 14, 2021

(30) Foreign Application Priority Data
Aug. 14, 2018  (DE) .................. 10 2018 119 693.8

(51) Int. Cl.
*B01J 19/30* (2006.01)
(52) U.S. Cl.
CPC ...... *B01J 19/30* (2013.01); *B01J 2219/30276* (2013.01)

(58) Field of Classification Search
None
See application file for complete search history.

(56) References Cited

U.S. PATENT DOCUMENTS

| 4,303,599 A | 12/1981 | Strigle et al. |
| 4,600,544 A | 7/1986 | Mix |

(Continued)

FOREIGN PATENT DOCUMENTS

| CN | 101553307 A | 10/2009 |
| CN | 204865852 U | 12/2015 |

(Continued)

OTHER PUBLICATIONS

Machine translation of EP 1 541 229 A1 (publication date Jun. 15, 2005), retrieved from EPO website on Apr. 25, 2022. (Year: 2022).*

(Continued)

*Primary Examiner* — Jennifer A Leung
(74) *Attorney, Agent, or Firm* — Buchanan Ingersoll & Rooney PC

(57) ABSTRACT

The present disclosure relates to a packing element, in particular for mass and/or heat exchange columns, through which at least one gas and/or at least one liquid flow flows, comprising a plurality of neighbouring strips curved inwards and/or outwards, wherein each strip is connected to the neighbouring strips at at least one end thereof. It is the object of the present invention to provide a packing element that is improved relative to the state of the art. According to the disclosure, this object is achieved in that at least one of the strips has an irregular shape.

16 Claims, 6 Drawing Sheets

(56) References Cited

U.S. PATENT DOCUMENTS

Figure 1:
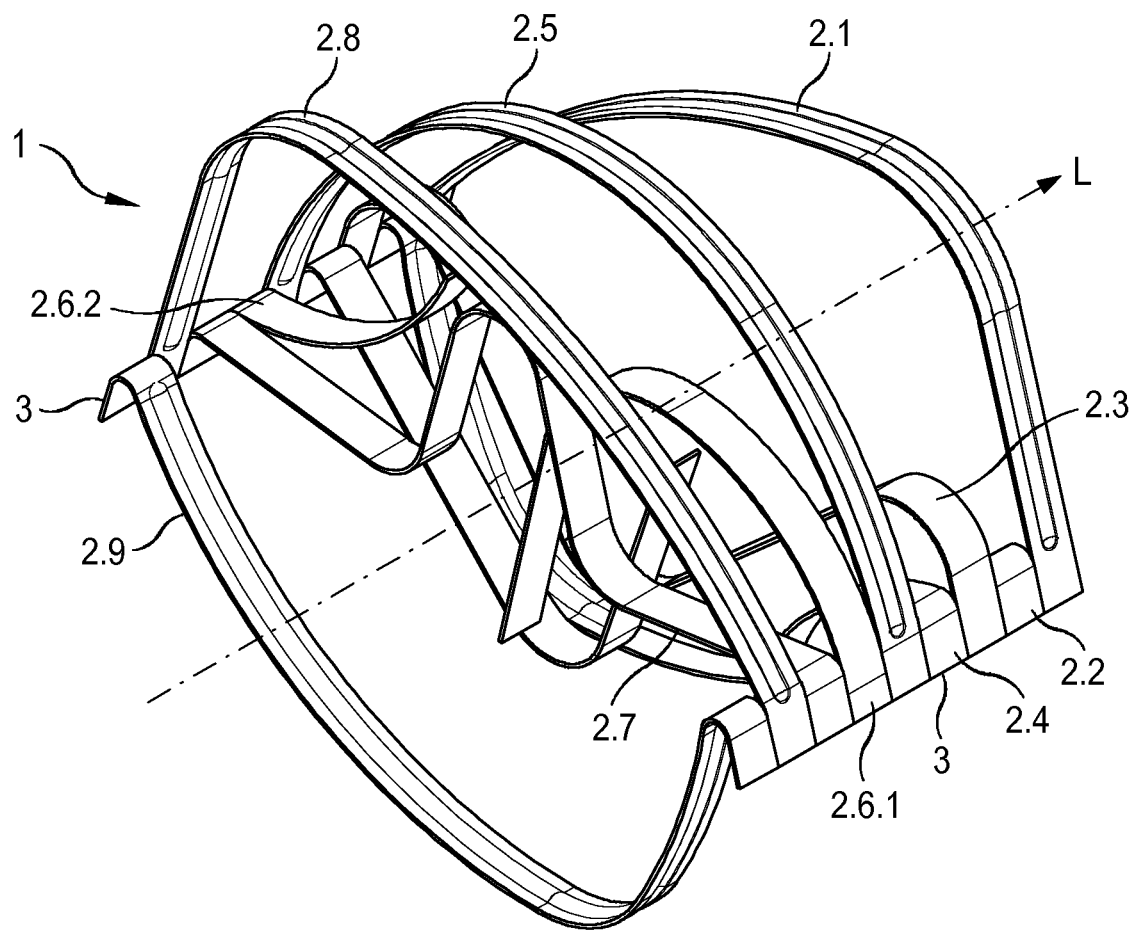

| | | | |
|---|---|---|---|
| 5,112,536 | A | 5/1992 | Mcnulty et al. |
| 5,543,088 | A | 8/1996 | Halbirt |
| 7,722,945 | B2 | 5/2010 | Nieuwoudt |
| 9,452,412 | B2 | 9/2016 | Ausner et al. |
| D780,286 | S * | 2/2017 | Ausner .................. D23/207 |
| 2008/0085400 | A1 | 4/2008 | Nieuwoudt |

FOREIGN PATENT DOCUMENTS

| | | |
|---|---|---|
| CN | 105682788 A | 6/2016 |
| CN | 107497393 A | 12/2017 |
| DE | 2710178 A1 | 9/1978 |
| DE | 8330573.4 U1 | 2/1984 |
| DE | 29513607.3 U1 | 10/1995 |
| DE | 102013018190.9 B4 | 3/2018 |
| EP | 0697246 A2 | 2/1996 |
| EP | 0764462 B1 | 3/2000 |
| EP | 1541229 A1 | 6/2005 |
| GB | 1177124 A | 1/1970 |
| WO | 2013143629 A1 | 10/2013 |

OTHER PUBLICATIONS

Office Action dated Jul. 28, 2021, by the Indian Patent Office in corresponding Indian Patent Application No. 202147005442, and an English Translation of the Office Action (6 pages).

International Search Report (PCT/ISA/210) with translation and Written Opinion (PCT/ISA/237) dated Oct. 7, 2019, by the European Patent Office as the International Searching Authority for International Application No. PCT/EP2019/071693.

German Search Report for DE 102018119693.8 dated Mar. 26, 2019.

"Modern Tower Technology Version 2", Lanzhou Petroleum Machinery Research Institute, China Petrochemical Press, Jan. 2005, p. 685.

Notification of the First Office Action dated Jan. 14, 2022, by the Chinese Patent Office in corresponding Chinese Patent Application No. 201980060686.4, and an English Translation of the Office Action. (13 pages).

Office Action dated Jan. 18, 2022, by the Canadian Patent Office in corresponding Canadian Patent Application No. 3,108,844. (5 pages).

The Singaporean Search Report dated Feb. 15, 2022, by the Singaporean Patent Office in corresponding Singaporean Application No. 11202101379U. (3 pages).

M. Chen, "Principles of Chemical Engineering with Less Class Period, 2nd Edition", East China University of Technology Press, Aug. 2013, pp. 164-165.

Second Office Action dated Jul. 13, 2022, by the Chinese Patent Office in corresponding Chinese Patent Application No. 201980060686.4, and an English Translation of the Office Action. (13 pages).

* cited by examiner

PACKING ELEMENT HAVING STRIPS WITH ASYMMETRICAL ARCH OR WAVE SHAPES

The present patent application relates to a packing element, in particular for mass and/or heat exchange columns, through which at least one gas and/or at least one liquid flow flows, comprising a plurality of strips arranged next to one another and curved inwards and/or outwards, wherein each strip is connected to the neighbouring strip(s) at at least one end thereof.

Such packing elements have already been known for a long time and are, for example, employed for mass and/or heat transfer processes in columns or chemical reactors. For example, these random packing elements, also referred to as dumped packing elements, are employed in gas-liquid contact appliances or liquid-liquid contact appliances to form mass transfer surfaces between a fluid flowing downwards, usually a liquid flow, and a fluid rising upwards, usually a gas or vapour flow, or another liquid flow.

Random packing elements are employed in a plurality of chemical methods and treatment processes, for example in rectification, absorption, desorption, and for the heat transfer in process industry, i. e., for example, in chemistry, petrochemistry, in the refinery field and in environmental engineering. The individual packing elements have certain geometric shapes and are designed to achieve a maximum separation performance with a predetermined mass transfer area.

The random packing elements are usually filled into the columns or reactors as bulk material such that a random packing element bed is formed. Therefore, the individual packing elements should also have a high mass transfer efficiency and good hydraulic capacity even in different orientations. Usually, an increase in the specific surface will lead to an increase in the mass transfer efficiency. An increase in the specific surface however, will also lead to an undesired increase in the pressure loss within the column. An excessively high increase in the pressure loss will finally lead to a flooding of the column where the liquid will be entrained in the gas flow. Thus, an excessively high pressure loss must be absolutely avoided.

A plurality of shapes and materials of random packing elements is known. For example, WO 2008/067031 A2 shows a saddle-shaped packing element with two elongate, spaced apart, curved side parts which define a curved longitudinal axis between them. Between the side parts and connected thereto, there are formed curved inner and outer ribs defining an inner volume of the packing element. Between the curved inner and outer ribs, at least one lower rib is formed and arranged within the inner volume of the packing element. This inner rib may have two vertices and be split into two segments. The ribs are essentially curved sinusoidally or embodied as part of a sine wave, respectively.

A disadvantage of this packing element is that the individual ribs at least partially overlap, seen along the curved longitudinal axis of the packing element. In this direction, the packing element therefore has a very large open cross-section which may lead to disadvantages, such as the formation of liquid conduits, and therefore to an impaired separation performance.

The object underlying the present invention therefore is to provide a packing element which further improves the packing elements known from prior art. In particular, the packing element is to contribute to an improved separation performance, a lower pressure loss and a high hydraulic capacity.

To this end, the invention provides that at least one of the strips has an irregular shape, wherein at least one of the strips is curved perpendicular to the longitudinal axis of the packing element like an arc or wave, and includes at least two changes of direction of its slope, i. e. that the arch shape of the strip is such that the slope changes its digit sign at least twice and the arch shape of the strip is asymmetrical, such that the strip does not have any symmetry in itself.

Since the strips are of a band shape, the shape of the strip will be described below as perpendicular to a longitudinal axis of the packing element. In this view, the shape of the strip can be described by a shape of a curve in a plane, this plane extending perpendicular to the longitudinal axis of the packing element. Irregular shape means that the shape of this strip highly deviates from a sine wave shape and does not have any periodically recurring elements. By the irregular shape of the at least one strip, the irregular or random structure, respectively, of the whole packing, which is formed when the packing element is dumped into the apparatus intended for this, is taken up in each individual packing element. This results in a more uniform coverage of the volume to be filled, leading to a better distribution of the fluids flowing through the apparatus. Thereby, an altogether improved separation performance is achieved. The change of direction can be effected continuously or discontinuously. This is a possibility to achieve the desired interruptions of the cross-section perpendicular to the longitudinal direction. This effect can even be intensified if several strips are provided with different asymmetrical arch shapes each.

It can also be provided that all strips of the packing element have different shapes so that the cross-section of the packing element is interrupted perpendicular to its longitudinal direction by numerous webs which, while they intersect each other, do not overlap in major areas. Thereby, the formation of liquid conduits is avoided and a large phase interface is achieved.

Preferably, the at least one strip may comprise at least two vertices and have different heights in the vertices. The change of direction of the slope is then effected in each vertex. The strip is thus constituted by at least two half-waves having different heights/amplitudes. If several strips with different asymmetrical arch shapes are provided, at least several vertices should have different heights. It can also be provided that two strips have the same or similar asymmetrical arch shapes but are formed in a mirror-inverted manner with respect to each other. This, too, leads to the strips that intersect the cross-section of the packing element not overlapping each other but rather intersecting at most in one point.

It may furthermore also be provided that the at least two vertices of the at least one strip have different distances to the respective neighbouring end of the strip. The strip is thus constituted of two half-waves having different wavelengths. This is also a measure to interrupt the cross-section of the packing element perpendicular to the longitudinal axis at as many points as possible to thus achieve a better distribution of the fluids flowing therethrough and finally improve the separation performance.

In a preferred embodiment, at least one strip may have three vertices, the central vertex having a first height and the two lateral vertices having second and third heights, and at least one of the heights differing from the other two heights. It may also be provided that all three vertices have different heights. By this, too, a good interruption of the cross-section of the packing element is achieved again, an overlapping of the strips is avoided, and finally a better separation performance is achieved.

It may furthermore be provided that at least one strip has three vertices and the distance from a first end of the strip to the central vertex is larger than the distance from a second end of the strip to the central vertex. By this, too, an asymmetrical shape of the strip is achieved which provides the already described desired effect of an interruption of the cross-section of the packing element and an improved separation performance.

In yet another embodiment, it can be provided that at least one strip is split into two segments transverse to its longitudinal direction. By this splitting, dripping points are formed in the interior of the packing element. Liquid flows arising at the packing element are interrupted, and an intense contact of the fluids flowing through the column/apparatus is achieved. At least one of the segments of the strip may have an asymmetrical arch shape as already described above. The other segment may be curved or straight. Advantageously, the other, second segment has an opposed slope compared to the end of the first arcuate segment facing the same. In this case, too, the strip has at least two changes of direction in the slope, one at the vertex of the arcuate first segment, the other one at the transition from the first to the second segment. Moreover, both segments may be arcuate. Moreover, both segments may have different lengths. In this case, the strip is thus not split centrically, but the split is offset to the middle.

It may also be provided that the ends of the two segments of the strip facing each other are spaced apart. Preferably, the ends of the two segments face into opposite directions. This leads to interruptions in the lateral area of the packing element through which fluids may then better flow in all directions.

In yet a further embodiment, the packing element may have at least one strip having a symmetrical arch shape with one vertex. This strip is preferably arranged centrically in the packing element. This leads to a good stability of the packing element. Moreover, at least two outer strips with an asymmetrical arch shape with one vertex each may be provided. These strips with only one vertex have a higher height at the vertex than the strips having several vertices. The lower strips, i. e. the strips having several vertices, are thus protected, and an interlocking with neighbouring packing elements is reduced.

If the two outer strips with only one vertex are curved in different directions, starting from a first mid-plane, a large volume may be encompassed. The first mid-plane is arranged centrically between a front and a back side of the packing element. By the achieved open concept, a low pressure loss may be realised.

This may be intensified by the vertices of the strips being arranged on different sides of a second mid-plane of the packing element extending centrically between the right and the left sides of the packing element.

Advantageously, at each end of the packing element, two strips with an asymmetrical arch shape having one vertex each may be arranged. That means, both at the upper and at the lower end of the packing element, two strips are arranged which have the described shape. Thereby, a high stability of the packing element is achieved.

In yet another variant, it may be provided that between the central strip and the outer strips, at least one strip with an asymmetrical arch shape having at least two vertices is arranged. This leads to a high stability, to a large surface where the separation process may be effected, to an open design with low pressure loss, and it avoids the interlocking of the packing elements.

In a particularly advantageous embodiment, it may be provided that the packing element comprises a central strip with a symmetrical arch shape having one vertex, at each end two outer strips with an asymmetrical arch shape having one vertex, which are curved in different directions and whose vertices are situated on different sides of a second mid-plane of the packing element arranged between the left and right sides of the packing element, between the central strip and the respective outer strips one strip each with an asymmetrical arch shape having three vertices, as well as one split strip each having two segments. These packing elements distribute uniformly within the columns and provide a uniform liquid flow through the column. Moreover, the structure of these packing elements cannot be, or can only hardly be, deformed.

To impart an increased strength to the packing element, at least one of the strips may be provided with a bead. Preferably, only those strips having only one vertex are provided with a bead. These high strips then provide the strength of the packing element, while the low strips having no bead and being smooth provide the liquid distribution within the packed bed. This may be intensified by at least two of the strips touching each other in one contact point.

The strength of the packing element may be further increased if at both lateral edges of the packing element, a transverse web extending across the complete length of the packing element into which the strips pass over is formed. These transverse webs may be beaded.

Preferably, the volume of the packing element enclosed by the strip is essentially cuboid. The ratio of the height of the packing element to the theoretical diameter of the packing element is approximately 0.6. It showed that with this ratio, a very good degree of filling of a given volume is achieved.

The size of the packing element has an impact on the volume flow and thus the capacity, and may therefore be selected corresponding to the respective case of application. The larger the packing element, the lower are the flow resistance and pressure loss. An open structure of the packing element increases the volume flow, while with a smaller size of the packing element, the efficiency of the separation process will increase since a larger surface for the separation process is available. A good contact with liquid and vapour increases the process efficiency and thus the quality of the process.

Figure 2:
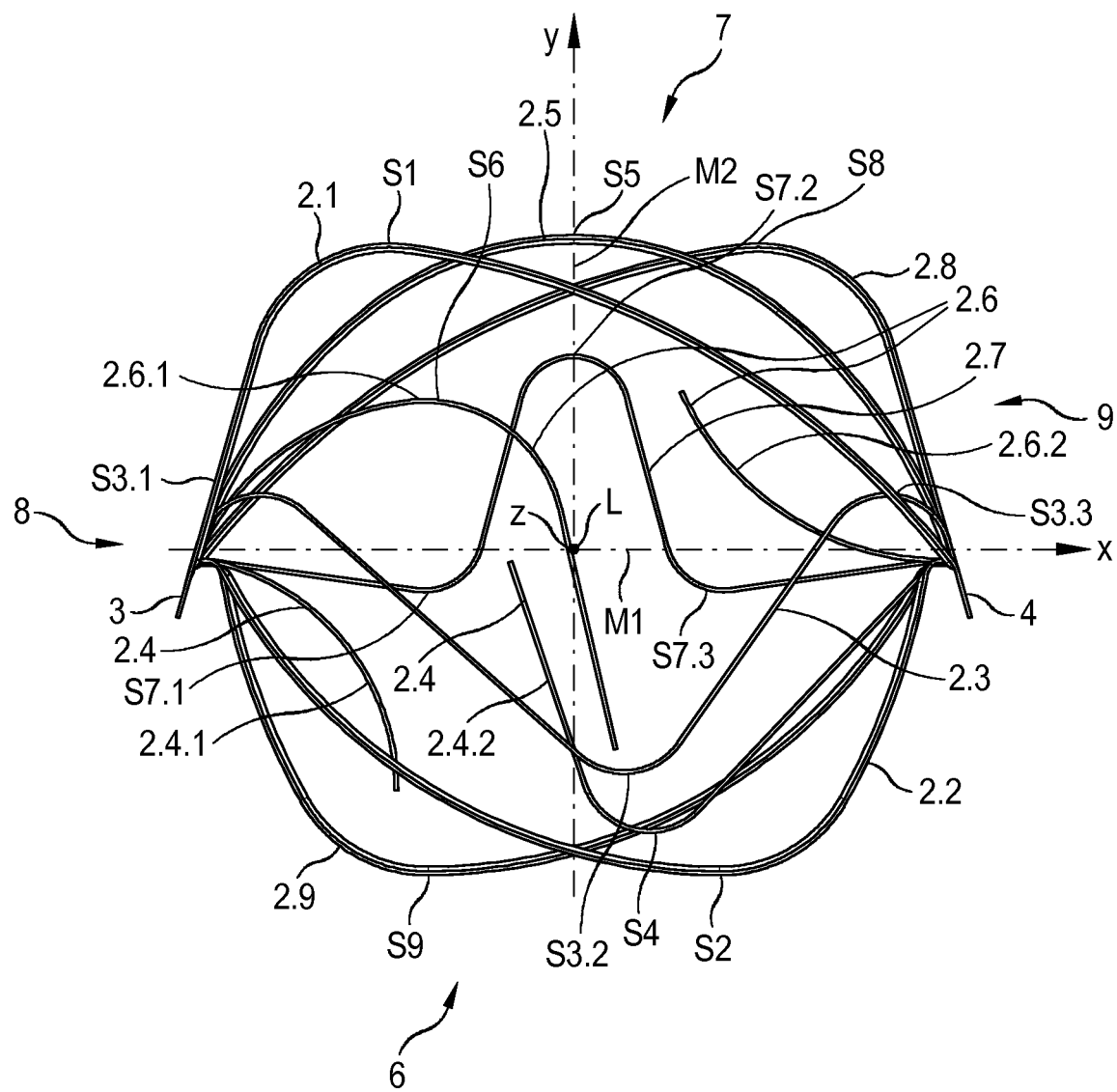
Figure 3:
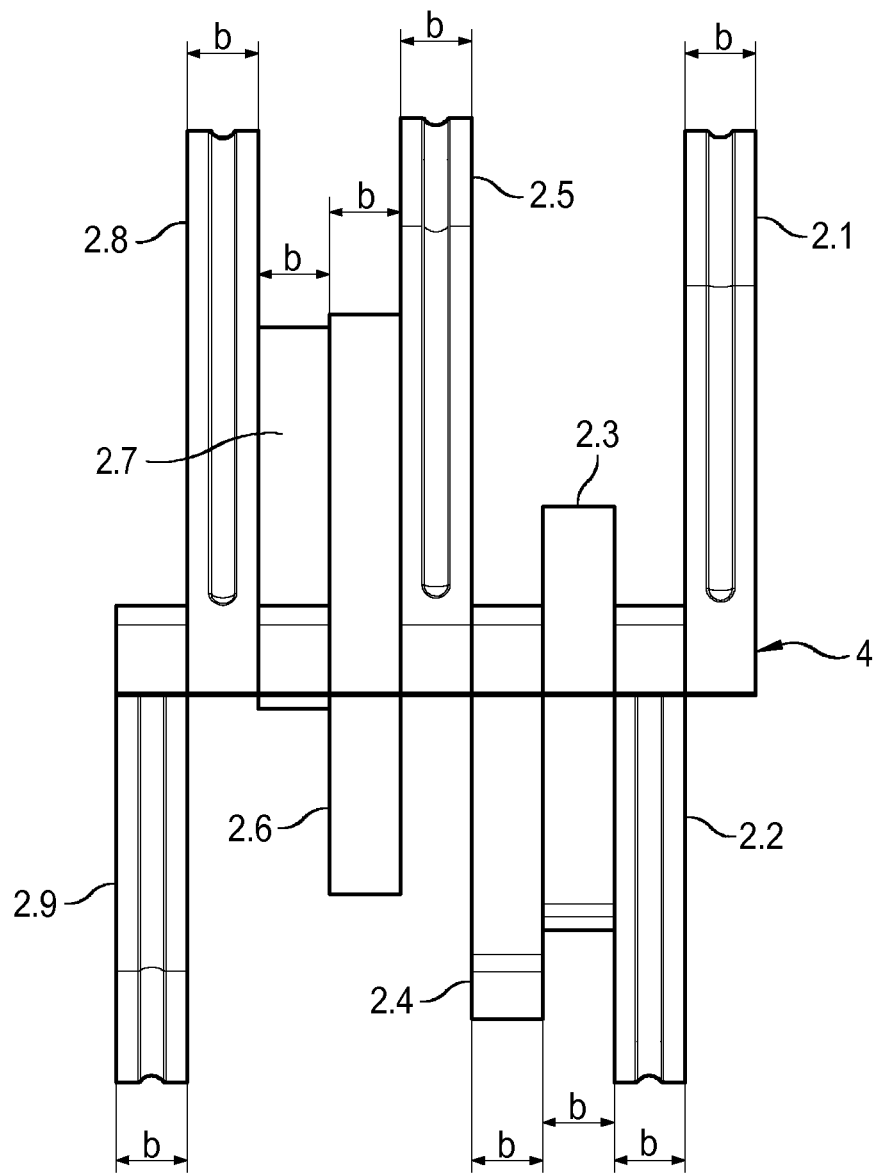
Figure 4:
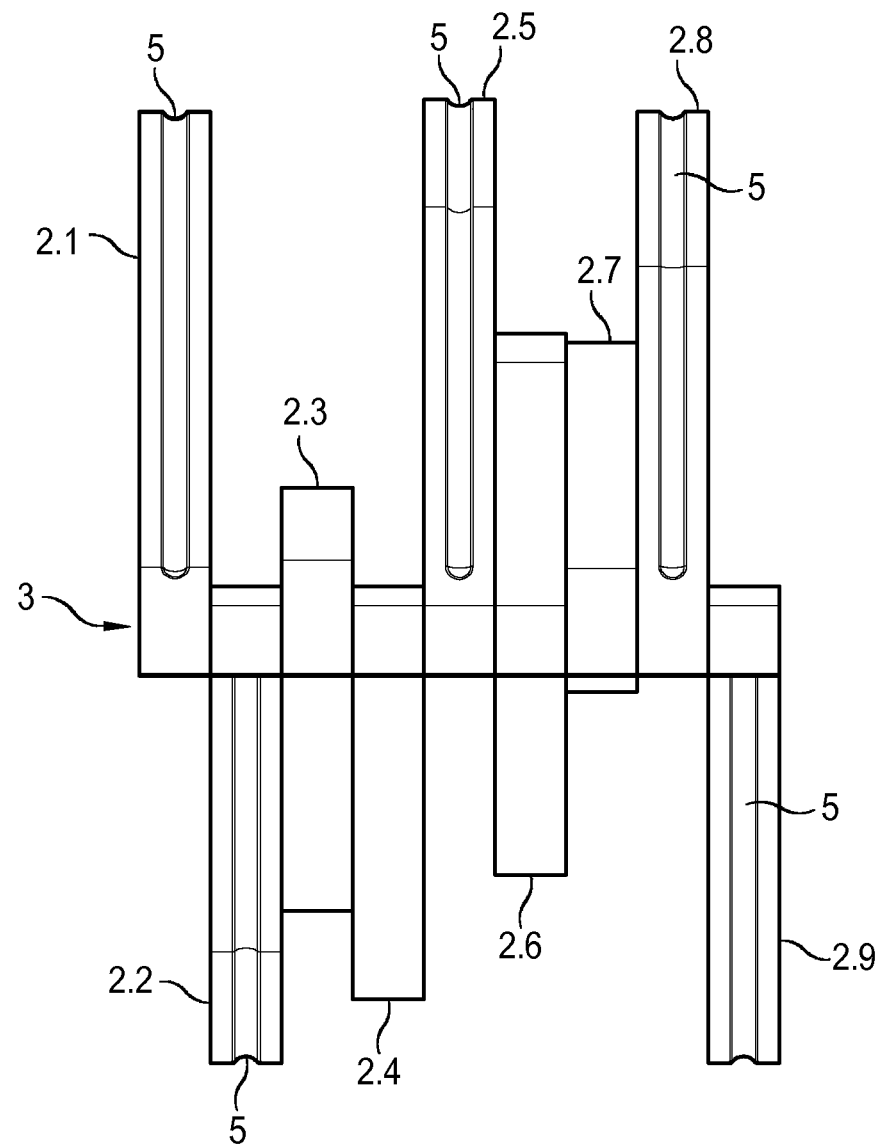
Figure 5:
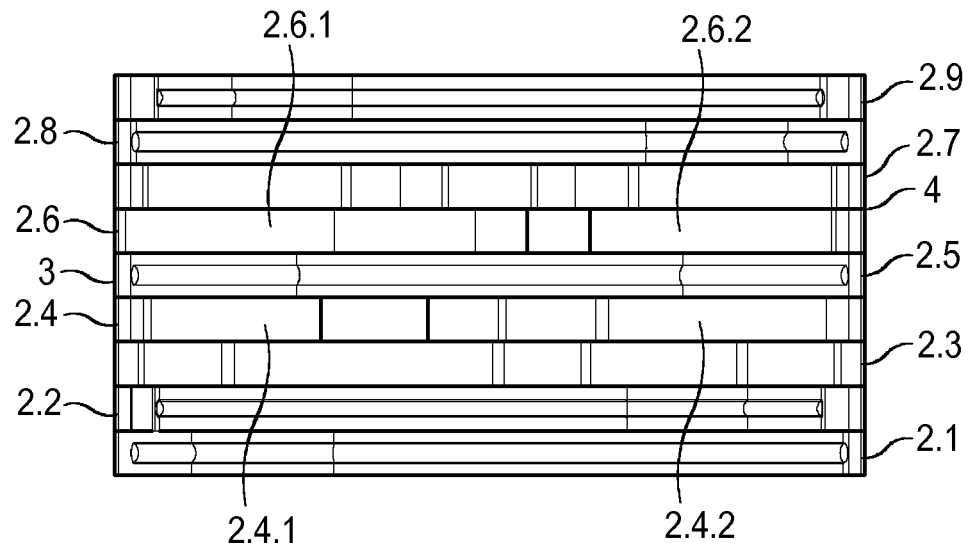
Figure 6:
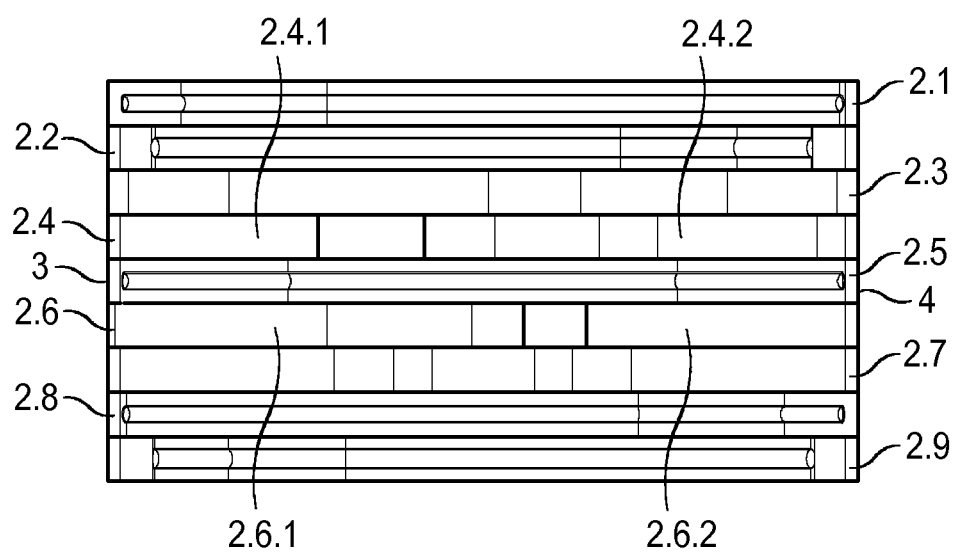

Below, the packing element will be illustrated more in detail with reference to figures. In the drawings:

FIG. 1 shows a perspective representation of the packing element according to the invention, FIG. 2 shows a plan view of the packing element of FIG. 1, FIG. 3 shows a view of the right side of the packing element of FIG. 1, FIG. 4 shows a view of the left side of the packing element of FIG. 1, FIG. 5 shows a view of the front side of the packing element of FIG. 1, FIG. 6 shows a view of the back side of the packing element of FIG. 1, and FIGS. 7*a-i* show a side view of the individual strips of the packing element of FIG. 1 transverse to the longitudinal direction of the packing element.

In FIG. 1, the packing element according to the invention is shown in a perspective representation. The packing element 1 comprises a plurality of, in the represented embodiment nine, neighbouring strips 2.1, 2.2, 2.3, 2.4, 2.5, 2.6, 2.7, 2.8, 2.9. The strips 2.1, 2.2, 2.3, 2.4, 2.5, 2.6, 2.7, 2.8, 2.9 are, starting from a first mid-plane M1 (see FIG. 2) of the packing element 1, bent open outwards and thus determine the volume of the packing element 1. The strips are band-like (lamellar) having a width b and a length l. The exact shape of the strips 2.1, 2.2, 2.3, 2.4, 2.5, 2.6, 2.7, 2.8, 2.9 will be illustrated more in detail with reference to the following figures.

Preferably, all strips have the same width b, in the represented embodiment it is 5 mm. However, it would also be possible that at least some strips have different widths. The length l of all strips is equal. At both edges of the packing element 1, transverse webs 3, 4 are formed in parallel to a longitudinal axis L of the packing element 1. The strips 2.1, 2.2, 2.3, 2.4, 2.5, 2.6, 2.7, 2.8, 2.9 end in the transverse webs 3, 4 and are firmly connected thereto. Thereby, each one of the strips 2.1, 2.2, 2.3, 2.4, 2.5, 2.6, 2.7, 2.8, 2.9 is connected to the respective neighbouring strip(s) 2.1, 2.2, 2.3, 2.4, 2.5, 2.6, 2.7, 2.8, 2.9. As can be clearly seen in FIG. 1, the transverse webs 3, 4 extend in parallel to the longitudinal axis L of the packing element 1. The strips 2.1, 2.2, 2.3, 2.4, 2.5, 2.6, 2.7, 2.8, 2.9 extend transverse to the transverse webs 3, 4, i. e. perpendicular to the longitudinal axis L of the packing element 1. The packing element 1 may be made, for example, of metal. In this case, the packing element 1 is made of a metal band. Here, cuts extending in parallel to the longitudinal direction of the metal band are incorporated into the metal band. The cuts do not extend across the complete width of the metal band, such that the transverse webs 3, 4 remain at both edges of the metal band perpendicular to the cuts. The strips formed by the cuts extending through the metal band in parallel to the longitudinal direction, that means the strips 2.1, 2.2, 2.3, 2.4, 2.5, 2.6, 2.7, 2.8, 2.9, are pressed out of the plane of the metal band so that a three-dimensional body, the packing element 1, is formed. By cuts extending transverse to the longitudinal direction of the metal band, the individual packing elements are separated from the metal band. Individual strips may be split into two segments with short cuts extending transverse to the longitudinal direction of the metal band.

As can be seen in FIG. 1, the strips 2.1, 2.2, 2.3, 2.4, 2.5, 2.6, 2.7, 2.8, 2.9 extend on both sides of the plane of the originally flat metal band and enclose a volume V. All strips 2.1, 2.2, 2.3, 2.4, 2.5, 2.6, 2.7, 2.8, 2.9 are provided in the process with an arch shape having at least one vertex. A vertex is here the highest or lowest point of an arc or a sector. At least one of the strips 2.1, 2.2, 2.3, 2.4, 2.5, 2.6, 2.7, 2.8, 2.9 has an irregular shape. The term "irregular shape" means that at least one of the strips highly differs from a sine wave shape and does not have any periodically recurring elements. This means in particular that at least one of the strips is curved in an arch or wave shape, has at least two changes of direction in its slope and does not have any symmetry in itself. The exact shape of the strips 2.1, 2.2, 2.3, 2.4, 2.5, 2.6, 2.7, 2.8, 2.9 will be discussed more in detail below, in particular with reference to FIGS. 7a-i.

FIG. 2 shows a plan view onto the packing element 1 along its longitudinal axis L. The arch shape of the strips 2.1, 2.2, 2.3, 2.4, 2.5, 2.6, 2.7, 2.8, 2.9 can be clearly seen. All strips 2.1, 2.2, 2.3, 2.4, 2.5, 2.6, 2.7, 2.8, 2.9 have different shapes. As can be clearly seen, the crosssection of the packing element 1 is approximately rectangular, therefore, the volume V enclosed by the strips 2.1, 2.2, 2.3, 2.4, 2.5, 2.6, 2.7, 2.8, 2.9 is approximately cuboid. The volume V is split by a first mid-plane M1 and a second mid-plane M2 that are perpendicular with respect to each other and intersect in the longitudinal axis L of the packing element 1. The first mid-plane M1 centrically extends between a front side 6 and a back side 7 of the packing element 1, the second mid-plane M2 extends centrically between a left side 8 and a right side 9 of the packing element 1.

In order to describe the shape of the strips 2.1, 2.2, 2.3, 2.4, 2.5, 2.6, 2.7, 2.8, 2.9 more in detail, a coordinate system may be placed into the packing element 1. The z-axis of the coordinate system extends along the longitudinal axis L of the packing element, the x-axis and the y-axis are perpendicular with respect to each other and with respect to the z-axis. That means, in FIG. 2, the x-axis extends along the two-dimensional representation of the first mid-plane M1, the y-axis extends along the two-dimensional representation of the second mid-plane M2, the z-axis extends in the intersection of the two mid-planes M1, M2, that means, as already described, along the longitudinal axis L of the packing element 1. The shape of the strips 2.1, 2.2, 2.3, 2.4, 2.5, 2.6, 2.7, 2.8, 2.9 may thus be described in the x-y-plane, that means in the plane perpendicular to the z-axis and thus to the longitudinal axis L of the packing element 1, with a shape of a curve, in the present case referred to as arch shape, and will be illustrated more in detail below.

In WO 2008/067031 A2, too, the individual strips can be described with reference to such a coordinate system. Here, too, the z-axis extends along the longitudinal axis of the packing element, which, however, is curved. Therefore, the z-axis is also curved. The shape of the individual strips may again also be described by a curve in the x-y-plane of the coordinate system, that means a plane perpendicular to the z-axis. Both in the embodiment shown in FIGS. 1 to 13 and in the embodiment shown in FIGS. 14 to 26, the curve shape of the strip is partially identical. The strips with identical strip shapes only differ in that they are arranged at different positions of the z-axis. Moreover, the strips are at least partially point-symmetrical to the origin of the coordinate system.

The cuboid shape of the packing element 1 is achieved in that four of the strips, i. e. the first strip 2.1, the second strip 2.2, the eighth strip 2.8 and the ninth strip 2.9, have an asymmetrical arch shape having one vertex S1, S2, S8, S9 each, wherein two of these four strips, i. e. the first strip 2.1 and the eighth strip 2.8, extend on the one side of the first mid-plane M1, and the other two of these four strips, i. e. the second strip 2.2 and the ninth strip 2.9, extend on the other side of the first mid-plane M1. The vertices S1, S2, S8, S9 of these four strips 2.1, 2.2, 2.8, 2.9 are each located next to the second mid-plane M2. Here, the vertices S1, S8; S2, S9 of the strips 2.1, 2.8; 2.2, 2.9, which are each located on the same side of the first mid-plane M1, are arranged on different sides of the second mid-plane M2. These four strips 2.1, 2.2, 2.8, 2.9 are formed at the upper and lower ends of the packing element 1, where two strips 2.1, 2.2; 2.8, 2.9 each are arranged at each end which each extend on different sides of the first mid-plane M1, and whose vertices S1, S2; S8, S9 are arranged on different sides of the second mid-plane M2.

Moreover, the packing element comprises a central strip 2.5 which has a symmetrical arch shape with a vertex S5. The vertex S5 of this strip 2.5 is therefore located in the second mid-plane M2. The central strip 2.5 extends towards the back side 7 of the packing element 1.

Since the strips 2.1, 2.2, 2.5, 2.8, 2.9 only have one vertex S1, S2, S5, S8, S9 each, they have a relatively high height and thus form an outer wall or outer hull of the packing element 1. Two multiply curved strips, the third strip 2.3 and the fourth strip 2.4, are arranged between the two strips 2.1, 2.2 formed at the first edge of the packing element, and the central strip 2.5.

The third strip 2.3 has an asymmetrical arch shape having three vertices S3.1, S3.2, S3.3, wherein the central vertex S3.2 extends to a side of the first mid-plane M1 other than the two other vertices S3.1, S3.3. Moreover, the central vertex S3.2 has a greater distance from the first mid-plane M1 than the other two vertices S3.1, S3.3. The two outer vertices S3.1, S3.3 both have the same distance to the first mid-plane 1. The central vertex S3.2 therefore has a higher height or a higher amplitude, respectively, than the two outer vertices S3.1, S3.3. In the shown plan view, the central vertex S3.2 is located right of the second mid-plane M2. The distance from the left transverse web 3 of the packing element 1 to the central vertex S3.2 of the strip 2.3 is therefore greater than the distance from the right transverse web 4 of the packing element 1 to the central vertex S3.2. Thus, the wavelength of the left region of the strip 2.3, i. e. starting from the left transverse web 3, to the central vertex S3.2 is greater than the wavelength of the right region of the strip 2.3, i. e. starting from the central vertex S3.2 to the right transverse web 4.

The fourth strip 2.4 is split into two segments 2.4.1 and 2.4.2. The first segment 2.4.1 extends, starting from the left transverse web 3 of the packing element 1, into the interior of the volume V of the packing element 1. The second segment 2.4.2 extends, starting from the right transverse web 4 of the packing element 1, into the interior of the volume V of the packing element. The two segments 2.4.1, 2.4.2 have different lengths, wherein the first, the left segment 2.4.1 is shorter than the second, the right segment 2.4.2. The first segment 2.4.1 extends, starting from the left transverse web 3, with a concave curvature, i. e. curved to the top in FIG. 2, in the direction of the front side 6 of the packing element 1. This means, the first segment 2.4.1 has no vertex. The second segment 2.4.2 points, starting from the right transverse web 4, also in the direction of the front side 6 of the packing element 1, however, in a straight line, has a vertex S4 and extends, behind the vertex S4, again in a relatively straight line to the top in the direction of the back side 7 of the packing element 1. The ends of the two segments 2.4.1 and 2.4.2 therefore face in different directions and are spaced apart with respect to each other.

By the multiple bending of the strips 2.3, 2.4, these strips 2.3, 2.4 have a lower height than the edge strips 2.1, 2.2, 2.8, 2.9, and the central strip 2.5.

Between the other two edge strips 2.8, 2.9 and the central strip 2.5, two multiply curved strips, the sixth strip 2.6 and the seventh strip 2.7, are arranged. The sixth strip 2.6 is arranged next to the central strip 2.5. The sixth strip 2.6 is also split into two segments 2.6.1, 2.6.2. The two segments 2.6.1, 2.6.2 have different lengths, wherein the first segment 2.6.1 starting from the left transverse web 3 is longer than the second segment 2.6.2 starting from the right transverse web 4. The first segment 2.6.1 extends, starting from the left transverse web 3, curved to the top, that means concavely, in the direction of the back side 7 of the packing element 1 to a vertex S6. There, the slope of the segment 2.6.1 changes direction, that means changes the digit sign, and the segment 2.6.1 extends from there in a straight line in the direction towards the front side 6 of the packing element 1 and intersects the second mid-plane M2 in the process. The second segment 2.6.2 extends, starting from the right transverse web 4, curved to the bottom, that means convexly, in the direction towards the back side 7 of the packing element 1. The ends of the two segments 2.6.1 and 2.6.2 are spaced apart and are located on different sides of the first mid-plane M1.

The seventh strip 2.7 is again a continuous strip having an asymmetrical arch shape and has three vertices S7.1, S7.2, S7.3. The central vertex S7.2 is located on a first side of the first mid-plane M1 facing the back side 7 of the packing element 1, the two other ones, the outer vertices S7.1, S7.3, are located on the other side of the first mid-plane M1 facing the front side 6 of the packing element 1. The central vertex S7.2 has a greater distance to the first mid-plane M1 than the other two vertices S7.1, S7.3. The two outer vertices S7.1, S7.3 have the same distance to the first mid-plane M1. The central vertex S7.2 therefore has a higher amplitude than the two outer vertices S7.1, S7.3. The central vertex S7.2 is located in the left next to the second mid-plane M2, such that the distance from the first, the left transverse web 3 to the central vertex S7.2 is smaller than the distance from the central vertex S7.2 to the second, the right transverse web 4 of the packing element 1. The left region of the strip 2.7, i. e. starting from the left transverse web 3 to the central vertex S7.2, therefore has a smaller wavelength than the right region of the strip 2.7, that means starting from the central vertex S7.2 to the right transverse web 4 of the packing element 1. The sixth strip 2.6 and the seventh strip 2.7 are again lower than the edge strips 2.1, 2.2, 2.8, 2.9 and the central strip 2.5.

The third, fourth, sixth and seventh strips 2.3, 2.4, 2.6, and 2.7 therefore split the packing element 1 transverse to the longitudinal axis L (see FIG. 2). Fluids flowing through the packing element 1 in the longitudinal direction are therefore split or interrupted, such that the formation of fluid conduits is avoided and the separation performance improved.

FIG. 3 shows the right side view of the packing element 1. The different heights of the nine strips 2.1, 2.2, 2.3, 2.4, 2.5, 2.6, 2.7, 2.8, 2.9 can be easily seen. The first strip 2.1, the second strip 2.2, the fifth strip 2.5, the eighth strip 2.8, and the ninth strip 2.9 have approximately the same height, wherein the second strip 2.2 and the ninth strip 2.9 extend to the other side of the first mid-plane M1 of the packing element 1 than the first strip 2.1, the fifth strip 2.5, and the eighth strip 2.8. The third strip 2.3, the fourth strip 2.4, the sixth strip 2.6 and the seventh strip 2.7 extend, starting from the first mid-plane M1, each in both directions of the packing element 1 and therefore have a clearly lower height than the other strips. Therefore, the packing element has a large open projected cross-sectional area in this axis. This can also be seen in FIG. 4 where the left side view of the packing element is shown. All strips 2.1, 2.2, 2.3, 2.4, 2.5, 2.6, 2.7, 2.8, 2.9 have the same width b. The edge strips 2.1, 2.2, 2.8, 2.9 and the central strip 2.5 are provided with a bead 5. This increases the strength of the packing element 1. The lower strips 2.3, 2.4, 2.6, 2.7 do not have a bead. This results in a function separation of the strips into the strips 2.1, 2.2, 2.8, 2.9, 2.5 which provide strength, and the strips 2.3, 2.4, 2.6, 2.7 which provide phase distribution.

FIG. 5 shows the front side 6 of the packing element 1, FIG. 6 shows the back side 7 of the packing element 1. All strips 2.1, 2.2, 2.3, 2.4, 2.5, 2.6, 2.7, 2.8, 2.9 extend in parallel with respect to each other and have the same widths b. The open projected cross-sectional area in this axis is rather small. Only the split strips 2.4 and 2.6 provide open areas.

In FIGS. 7a to 7i, the individual strips are each shown in a view perpendicular to the longitudinal axis L of the packing element.

Figure 7:
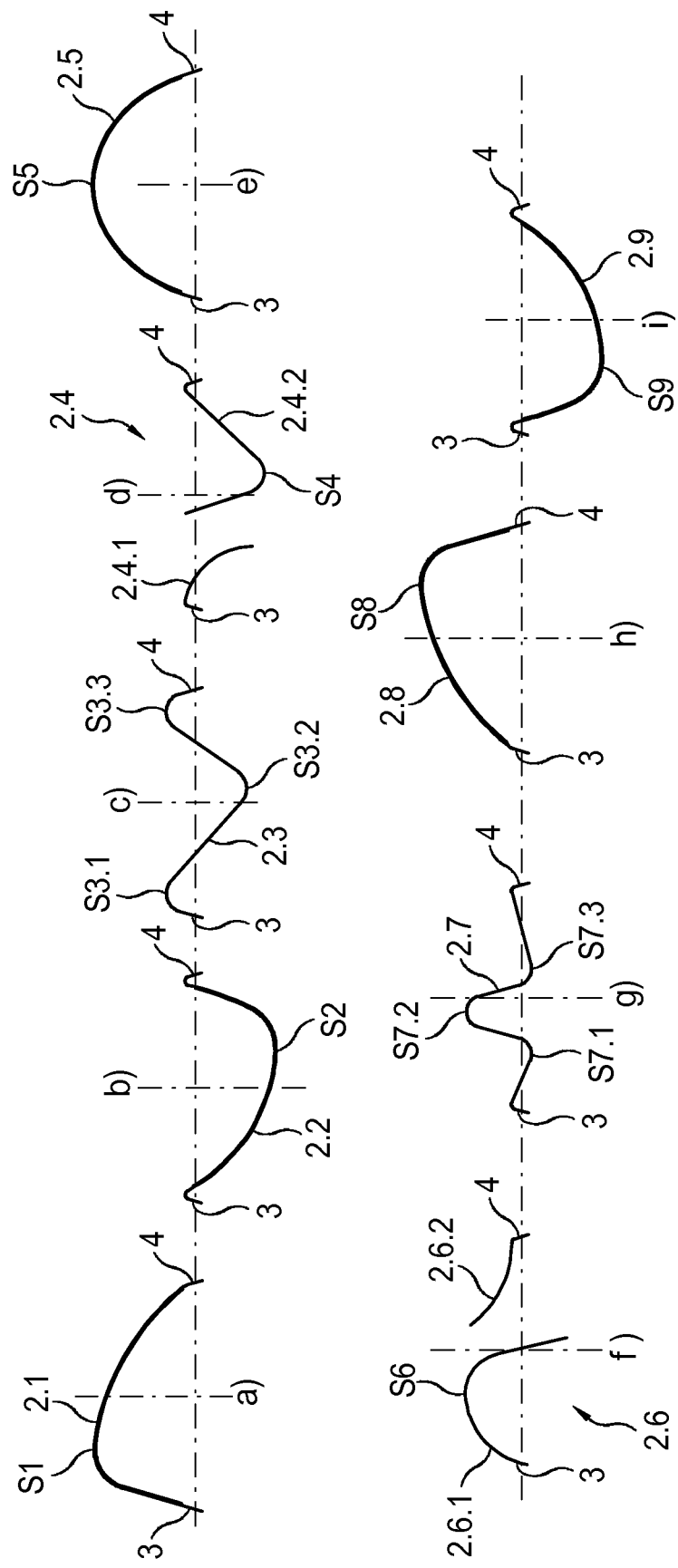

FIG. 7a shows the first strip 2.1. This strip 2.1 is an edge strip. The first strip 2.1 has an asymmetrical arch shape having one vertex S1. The vertex S1 is arranged eccentrically, i. e. the distance from the first, i. e. the left transverse web 3 to the vertex S1 is smaller than the distance from the second, i. e. the right transverse web 4 to the vertex S1. The strip 2.1 is curved to the top, i. e. it has a concave curvature. At the transition to the right transverse web 4, the strip 2.1 has a sharp bend. For the complete description of FIG. 7, i. e. for FIGS. 7a to 7i, the term "to the top" means facing to the back side 7 of the packing element 1. Correspondingly, the term "to the bottom" means facing to the front side 6 of the packing element 1.

FIG. 7b shows the second strip 2.2. This strip 2.2 is also an edge strip. The second strip 2.2 also has an asymmetrical arch shape having one vertex S2, wherein the distance from the first, i. e. the left transverse web 3 to the vertex S2 is greater than the distance from the second, i. e. the right transverse web 4 to the vertex S2. The strip 2.2 is curved downwards, that is it has a convex curvature, wherein the two lateral transverse webs 3, 4 extend to the top and the second strip 2.2 only bends sharply after that.

In FIG. 7c, the third strip 2.3 is shown. The third strip 2.3 has an asymmetrical arch shape having three vertices S3.1, S3.2, S3.3. Starting from the first, i. e. the left transverse web 3, the third strip 2.3 extends to the top up to the first outer vertex S3.1. From the first outer vertex S3.1, the third strip 2.3 extends relatively straightly to the bottom, and includes an angle of about 40° with the first mid-plane M1, to the second, the central vertex S3.2, and from there extends again relatively straightly, including an angle of about 55° with the first mid-plane M1, to the top to the third, also an outer, vertex S3.3. The central vertex S3.2 has a greater distance from the first mid-plane M1 (see FIG. 2) than the first vertex S3.1 and the third vertex S3.3. The first vertex S3.1 and the third vertex S3.3 have approximately the same distance from the first mid-plane M1. The distance from the first, i. e. the left transverse web 3 to the central vertex S3.2 is greater than the distance from the second, i. e. the right transverse web 4 to the central vertex S3.2. The two outer vertices S3.1, S3.3 approximately have the same lateral distance to the respective neighbouring transverse web 3, 4. Therefore, the distance from the first outer vertex S3.1 to the central vertex S3.2 is greater than the distance from the second outer vertex S3.3 to the central vertex S3.2.

FIG. 7d shows the fourth strip 2.4. The fourth strip 2.4 is a split strip and comprises the two segments 2.4.1 and 2.4.2. The first segment 2.4.1 is shorter than the second segment 2.4.2. The first segment 2.4.1 shortly extends to the top, this length approximately corresponds to the left transverse web 3, and then sharply bends in the direction of the front side 6 of the packing element 1 and extends to the top in a curved manner, i. e. concavely. The second segment 2.4.2 of the strip 2.4 shortly extends to the top, this corresponds to the right transverse web 4, then sharply bends to the bottom and extends relatively straightly, including an angle of approximately 45° with the first mid-plane M1, to a vertex S4. There, the direction of the slope of the segment 2.4.2 changes, and the segment 2.4.2 extends straightly, including an angle of about 70° with the first mid-plane M1, to the top up to the end of the segment 2.4.2. The ends of the two segments 2.4.1 and 2.4.2 are spaced apart and face into different directions.

FIG. 7e shows the fifth strip 2.5. The fifth strip 2.5 has a symmetrical arch shape having a vertex S5. The vertex S5 also has the same distance from both transverse webs 3, 4. The central strip 2.5 is curved to the top, i. e. it has a concave curvature and is only formed on one side of the first mid-plane M1.

FIG. 7f shows the sixth strip 2.6. This is again a split strip, i. e. the strip 2.6 comprises two segments 2.6.1 and 2.6.2.

The ends of the two segments 2.6.1 and 2.6.2 are spaced apart. The segment 2.6.1 in the left in FIG. 7f extends, starting from the left transverse web 3, with a concave curvature to the top up to a vertex S6 and leads from there to the bottom, essentially along a straight line that includes an angle of approximately 80° with the first mid-plane M1. The second, right segment 2.6.2 follows the right transverse web 4 at an angle of approximately 90° and leads from there in a convex curvature inwards and to the top. The ends of the two segments 2.6.1 and 2.6.2 are located on different sides of the first mid-plane M1. The first segment 2.6.1 is longer than the second segment 2.6.2.

FIG. 7g shows the seventh strip 2.7. This is a low strip with an asymmetrical arch shape having three vertices S7.1, S7.2, S7.3. The strip 7.2 follows the left transverse web 3 at an angle of about 90°, extends straightly to the bottom and includes an angle of about 25° with the first mid-plane M1 and passes over into a first lower vertex S7.1 with a curvature. Starting from this first lower vertex S7.1, the strip 7.2 extends to the top with a curvature and passes over into a straight line including an angle of about 75° with the first mid-plane M1. The straight line in turn passes over into a central upper vertex S7.2 with a curvature. Starting from this central vertex S7.2, the strip 7.2 turns again to the bottom with a slight curvature and passes over into a straight line including an angle of about 75° with the first mid-plane M1 and passing over into a second lower vertex S7.3 with a curvature. Starting from the second lower vertex S7.3, the seventh strip 2.7 passes over into a straight section with a curvature including an angle of about 15° with the first mid-plane M1 and ending in the right transverse web 4 at an angle of about 90°. The first lower vertex S7.1 and the second lower vertex S7.3 approximately have the same distance to the first mid-plane M1. This distance is smaller than the distance of the central upper vertex S7.2 to the first mid-plane M1. The central vertex S7.2 also has a higher height or higher amplitude, respectively, than the lower vertices S7.1 and S7.3. The first lower vertex S7.1 and the second lower vertex S7.3 have the same lateral distance to the central vertex S7.2. However, the two lower vertices S7.1 and S7.3 have different distances to the respective neighbouring transverse web 3, 4. The distance of the first lower vertex S7.1 to the left transverse web 3 is smaller than the distance of the second lower vertex S7.3 to the right transverse web 4. Thus, the central vertex S7.2, too, has different distances to the transverse webs 3, 4.

FIG. 7h shows the eighth strip 2.8. The eighth strip 2.8 has an asymmetrical arch shape having one vertex S8. Starting from the left transverse web 3 which is followed by the eighth strip 2.8 at an angle of about 135°, the eighth strip 2.8 curves to the top (concave curvature) up to the vertex S8. At the vertex S8, the direction of the slope of the eighth strip 2.8 changes, and the eighth strip 2.8 extends again to the bottom, passes over into a straight region which straightly passes over into the right transverse web 4. The distance from the left transverse web 3 to the vertex S8 is greater than the distance from the vertex S8 to the right transverse web 4.

FIG. 7i shows the ninth strip 2.9. The ninth strip 2.9 follows the left transverse web 3 and extends from there with a convex curvature to the bottom down to a vertex S9. Starting from the vertex S9, the ninth strip 2.9 extends again to the top and passes over into the right transverse web 4. The strip 2.9 has again an asymmetrical arch shape having one vertex S9, that means the distance from the left transverse web 3 to the vertex S9 is smaller than the distance from the vertex S9 to the right transverse web 4.

The two transverse webs 3, 4 always extend slightly obliquely to the top. The nine strips 2.1, 2.2, 2.3, 2.4, 2.5, 2.6, 2.7, 2.8, 2.9 smoothly pass over into the transverse webs 3, 4.

The strips 2.3, 2.4, 2.6, 2.7, the low strips, have a lower height than the strips 2.1, 2.2, 2.5, 2.8, 2.9, the high strips.

The transverse webs are not part of the strips.

As materials for the packing element, preferably metals, for example high-quality steel, are employed. However, it would also be conceivable to produce such packing elements from plastic. The above-described manufacturing process is, of course, not applicable to packing element of plastic.

LIST OF REFERENCE NUMERALS

1 packing element
2.1 first strip
2.2 second strip
2.3 third strip
2.4 fourth strip
2.4.1 first segment of fourth strip
2.4.2 second segment of fourth strip
2.5 fifth or central strip
2.6 sixth strip
2.6.1 first segment of sixth strip
2.6.2 second segment of sixth strip
2.7 seventh strip
2.8 eighth strip
2.9 ninth strip
3 left transverse web
4 right transverse web
5 bead
6 front side of packing element
7 back side of packing element
8 left side of packing element
9 right side of packing element
M1 first mid-plane
M2 second mid-plane
L longitudinal axis of packing element
V volume of packing element
b width of strips
l length of strips
S1 vertex of first strip
S2 vertex of second strip
S3.1 first vertex of third strip
S3.2 second vertex of third strip
S3.3 third vertex of third strip
S4 vertex of fourth strip
S5 vertex of fifth strip
S6 vertex of sixth strip
S7.1 first vertex of seventh strip
S7.2 second vertex of seventh strip
S7.3 third vertex of seventh strip
S8 vertex of eighth strip
S9 vertex of ninth strip

The invention claimed is:

1. Packing element, suitable for mass and/or heat exchange columns, through which at least one gas and/or at least one liquid flow flows, the packing element comprising:
   a plurality of neighbouring strips curved inwards and/or outwards,
   wherein each strip is connected to neighbouring strips at at least one end thereof,
   wherein at least one of the strips has an irregular shape, such that the at least one strip is curved perpendicular to a longitudinal axis of the packing element in an arch or wave shape and includes at least two changes of direction of its slope, whereby the arch or wave shape of the at least one strip is such that the slope changes a digit sign at least twice and the arch or wave shape of the at least one strip is asymmetrical, so that the at least one strip does not have any symmetry in itself, wherein the at least one strip has at least two vertices and has different heights in at least two of the vertices,
   wherein another strip of the plurality of neighbouring strips is a split strip that is split into two segments transverse to its longitudinal direction, and
   all strips have different shapes, so that a cross-section of the packing element is interrupted perpendicular to its longitudinal direction by numerous webs which, while they intersect each other, do not overlap in major regions.

2. Packing element according to claim 1, wherein the at least two vertices have different distances to the respective neighbouring end of the at least one strip.

3. Packing element according to claim 1, wherein the at least one strip has three vertices, the central vertex having a first height and the two lateral vertices having a second and a third height, and at least one of the heights differing from the other two heights.

4. Packing element according to claim 3, wherein the distance from a first end of the at least one strip to the central vertex is greater than the distance from a second end of the at least one strip to the central vertex.

5. Packing element according to claim 1, wherein the two segments of the split strip have different lengths.

6. Packing element according to claim 1, wherein at least one of the segments of the split strip has an arch or wave shape.

7. Packing element according to claim 1, wherein the ends of the two segments of the split strip facing each other are spaced apart.

8. Packing element according to claim 1, wherein at least one central strip has a symmetric arch or wave shape having one vertex.

9. Packing element according to claim 1, wherein at least two outer strips have an asymmetrical arch or wave shape having one vertex.

10. Packing element according to claim 9, wherein the packing element includes a first mid-plane and a second mid-plane, and the at least two outer strips are, starting from the first mid-plane, curved in different directions.

11. Packing element according to claim 9, wherein the packing element includes a first mid-plane and a second mid-plane, and the vertices of the at least two outer strips are arranged on different sides of the second mid-plane.

12. Packing element according to claim 9, wherein at each end of the packing element, two outer strips with an asymmetrical arch or wave shape having one vertex are arranged.

13. Packing element according to claim 8, wherein between the at least one central strip having a symmetric arch or wave shape having one vertex and at least two outer strips having an asymmetrical arch of wave shape having one vertex, the at least one strip having an irregular shape is arranged.

14. Packing element according to claim 1, wherein:
   the plurality of neighbouring strips include a central strip, two outer strips at each end of the packing element, two of the strips having an irregular shape, and two of the split strip;
   the packing element includes a first mid-plane and a second mid-plane;

wherein:
the central strip has a symmetrical arch or wave shape having one vertex;
each of the two outer strips at each end of the packing element has an asymmetrical arch or wave shape having one vertex each, which are curved in different directions and whose vertices are located on different sides of the second mid-plane of the packing element arranged between a left and a right side of the packing element;
one of the strips having an irregular shape and one of the split strips are positioned between the central strip and the two outer strips at one end of the packing element;
and the other strip having an irregular shape and the other split strip are positioned between the central strip and the two outer strips at the other end of the packing element.

15. Packing element according to claim 1, wherein another strip of the plurality of neighbouring strips is provided with a bead.

16. Packing element according to claim 1, wherein at least one strip of the plurality of neighbouring strips has only one vertex, and only the at least one strip of the plurality of neighbouring strips having only one vertex is provided with a bead.

* * * * *